No. 708,356. Patented Sept. 2, 1902.
H. H. HENNEGIN.
COMBINED DRIVING GEAR AND BRAKE FOR MOTOR VEHICLES.
(Application filed Apr. 8, 1901.)
(No Model.)
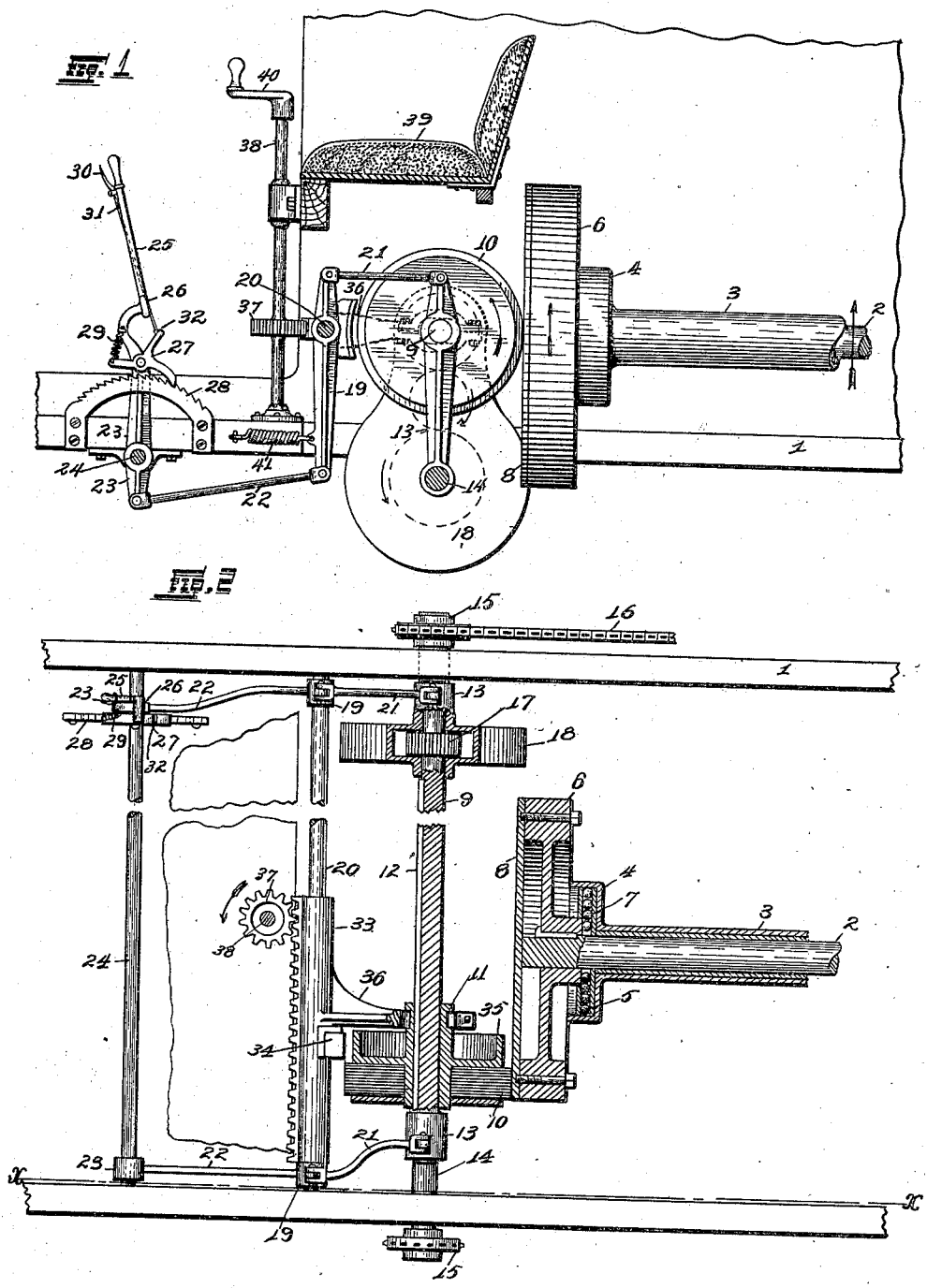
Witnesses
Alfred W. Eicker
J. D. Rippey
Inventor:
Herbert H. Hennegin,
By Higdon & Longan, Attys.

UNITED STATES PATENT OFFICE.

HERBERT H. HENNEGIN, OF ST. LOUIS, MISSOURI, ASSIGNOR TO INTERNATIONAL MOTOR COMPANY, OF ST. LOUIS, MISSOURI, A CORPORATION OF MISSOURI.

COMBINED DRIVING-GEAR AND BRAKE FOR MOTOR-VEHICLES.

SPECIFICATION forming part of Letters Patent No. 708,356, dated September 2, 1902.

Application filed April 8, 1901. Serial No. 54,964. (No model.)

*To all whom it may concern:*

Be it known that I, HERBERT H. HENNEGIN, of the city of St. Louis, State of Missouri, have invented certain new and useful Improvements in a Combined Driving-Gear and Brake for Motor-Vehicles, of which the following is a full, clear, and exact description, reference being had to the accompanying drawings, forming a part hereof.

My invention relates to a combined driving-gear and brake for motor-vehicles; and it consists of the novel construction, combination, and arrangement of parts hereinafter shown, described, and claimed.

The object of my invention is to provide an improved motor-vehicle brake and combined speed-changing and reverse gear.

Figure 1 is a sectional side elevation of parts of a motor-vehicle having my invention applied thereto, said section being taken on the line *x x* of Fig. 2. Fig. 2 is a sectional plan view of the same.

1 indicates the frame on which the driving-gear is mounted, and 2 represents the main shaft of the motor. (Not shown.) The motor may of course be of any desired form—such, for instance, as an explosive-engine or a steam-engine.

My invention is designed especially for use in connection with an explosive-engine, in which the main shaft carrying the driving-wheel revolves continuously in one direction. The main shaft 2 is preferably mounted in an extra long bearing 3, carrying at one end an antifriction thrust-bearing 4, composed of a series of balls 5, interposed between the moving surface of the fly-wheel 6 and the stationary surface 7 of said bearing. The fly-wheel 6 is provided on one face with a friction-plate 8.

9 indicates the driven shaft, extending transversely of the frame directly in front of the fly-wheel 6, and loosely splined upon said shaft is a friction-wheel 10, in the hub of which is a groove 11. 12 indicates the spline of said shaft 9. Said shaft 9 is loosely supported in position upon two parallel vertical arms 13, pivoted at their lower ends upon a countershaft 14, extending parallel with said shaft 9 and upon the outer projecting ends of which are mounted the usual sprocket-wheels or pinions 15, which latter are to be engaged by the usual chains 16, extending to ordinary sprocket-wheels upon the driving-wheels of the vehicle. (Not shown.) The arms 13 serve to space apart the two shafts 9 and 14, and motion is imparted from the former to the latter by means of an ordinary train of gear-wheels 17, contained within a swinging casing 18, the uppermost gear only being shown. 19 indicates a pair of rock-levers mounted upon a transverse shaft 20, extending parallel with said shaft 9 and directly in front of the same. The upper ends of said levers 19 are connected to the upper free ends of the arms 13 by means of rods 21, and the lower ends of said rock-levers are connected by rods 22 to depending arms 23, fixed upon a transverse rock-shaft 24. Said shaft 24 is rocked by means of a combined hand and foot lever 25, the upper end of which is provided with a handhold, below which is fashioned a foothold 26, whereby said lever may be manipulated by means of either the hand or foot of the operator. The said lever 25 is locked in position by means of the pawl 27, which is pivoted upon said lever at a point directly above a toothed sector 28. Said pawl is normally held in engagement with said toothed sector by means of a spring 29, secured to one of the free ends of said pawl and having its upper end fastened to said lever 25. An auxiliary handle 30 of common construction is connected to the upper portion of said lever 25, and a rod 31 extends downwardly and has its lower end connected to an arm 32 of said pawl, whereby said pawl may be manipulated by the operator in grasping the handhold of said lever 25.

33 indicates a toothed sleeve mounted to slide upon the shaft 20 and having fixed thereon a brake-block 34 to engage the metallic friction-surface 35 of the friction-wheel 10. An arm 36 projects from said sleeve and is mounted to slide in the groove 11 in the hub of said friction-wheel 10. This sliding engagement of the arm 36 with the groove 11 facilitates the forward bodily movement of the wheel 10 and the application of the periphery of the same against the brake-shoe 34. The loose connection also permits the revolution and sliding movement of the wheel 10. The said toothed sleeve 33 is moved upon the shaft 20 by means of a pinion 37, meshing with the teeth of said toothed sleeve, and said pinion is fixed upon a vertical controller-shaft 38, mounted in suitable bearings in front of the operator's seat 39. Said controller-shaft is provided at its upper end with a suitable handle 40. The friction-wheel 10 is caused to contact with the friction-plate 8 by means of a spring 41, one end of which is secured to the frame 1 and the opposite end of which is fastened to the lower portion of one of said rock-levers 19.

The operation is as follows: The main shaft 2 being driven in the direction indicated by the arrow in Fig. 1, the fly-wheel 6 will of course be rotated in a corresponding direction, and with the parts in the position shown the friction-wheel 10 will be driven in a corresponding direction, as will also the shaft 9, gear-wheel 17, counter-shaft 14, and sprocket-wheels 15, and the vehicle will be propelled in a given direction as long as the parts remain in the relation in which they are shown. The friction-wheel 10 being located at the periphery of the friction-plate 8 causes the same to be driven at the highest speed. When the operator desires to reduce the speed of the vehicle, he grasps the handle 25 or causes his foot to engage the footpiece 26, and thereby throws the lever forwardly, which has the effect of urging the lower ends of the rock-levers 19 rearwardly in opposition to the power of the spring 41, thereby withdrawing the said friction-wheel 10 from contact with the said friction-plate 8. Then he grasps the controller-handle 40 and rotates the pinion 37 in the direction indicated by the arrow in Fig. 2, thereby sliding the toothed sleeve 33 and the friction-wheel 10 in a corresponding direction and locate said friction-wheel nearer the center of said friction-plate, whereby the same will be driven at a reduced speed. In order to bring the vehicle to a stop, the lever 25 is thrown still farther forwardly until the brake-shoe 34 is brought into contact with the frictional surface 35 of said friction-wheel 10, thereby bringing said wheel to a sudden stop and of course arresting the movement of the vehicle. When it is desired to reverse the movement, the operator turns the controller-handle 40 still farther in the direction above indicated until the friction-wheel 10 is located upon the opposite side of the friction-plate 8, and thus said friction-wheel 10 is again thrown into contact with said friction-plate 8, and the movement of the vehicle will thereby be reversed. The end thrust upon the main shaft 2 is received by the balls 7, and considerable friction is thereby obviated.

My improved driving-gear and brake for motor-vehicles has proven in actual practice to be very efficient and reliable.

I claim—

1. A driving-gear for motor-vehicles comprising a main operating-shaft, a friction-wheel at one end thereof, a shaft 14, upwardly-extending arms pivoted to the shaft 14, a friction-disk supported between the arms and adapted to engage the friction-wheel, a shaft 20, rock-levers pivoted to the shaft 20 and connections 21 between the upper end of the pivoted arms and the upper ends of the rock-levers, and means for operating the rock-levers to throw the friction-disk into and out of engagement with the friction-wheel, substantially as described.

2. In combination with motor-driven instrumentalities, speed-changing devices in communication therewith comprising opposing friction-disks, means for shifting one of the disks across the face of the other, a brake carried by the disk-shifting means, and means for swinging the shiftable disk toward and from the other disk and into engagement with the brake; substantially as described.

3. In combination with motor-driven instrumentalities, speed-changing devices in communication therewith comprising opposing disks, means for shifting one of the disks across the face of the other, a brake movable with said shiftable disk, and means for causing a frictional engagement between said shiftable disk and the brake, substantially as described.

4. A combined driving-gear and brake for motor-vehicles, comprising a revoluble friction-plate, a friction-wheel mounted to engage said friction-plate and shiftable across the face thereof, a brake shiftable with the friction-wheel, and means for retracting said friction-wheel from engagement with said friction-plate and forcing the same into contact with said brake; substantially as described.

5. A combined driving-gear and brake for motor-vehicles comprising a revoluble friction-plate, a friction-wheel mounted to engage said friction-plate and shiftable across the face thereof, a brake shiftable with the friction-wheel, and means operating by its initial movement to retract the friction-wheel from engagement with the friction-plate, and by further movement to force said friction-wheel into contact with the brake; substantially as described.

6. A combined driving-gear and brake for motor-vehicles, constructed with a friction-plate adapted to revolve continuously in a given direction, a friction-wheel mounted to engage said friction-plate on either side of the center of said plate, a brake for said friction-wheel and adapted to be shifted therewith, and a ball-bearing for receiving the thrust of said friction-plate, substantially as specified.

7. A combined driving-gear and brake for motor-vehicles, having a friction-wheel 10 provided with a peripheral friction-surface 35, a continuously-revolving friction-plate, means for urging said friction-wheel into contact with said friction-plate, a toothed rack for moving said friction-wheel nearer to or farther from the periphery of said friction-plate, and a brake carried by said toothed rack and adapted to engage said frictional surface of said friction-wheel, substantially as specified.

8. In a driving-gear for motor-vehicles, devices for changing the speed of the vehicle, a combined hand and foot lever for controlling said devices, a toothed sector, a pawl having an arm to be engaged by the operator's foot, an auxiliary handle on said lever, and a connection between said auxiliary handle and said pawl, substantially as specified.

In testimony whereof I affix my signature in presence of two witnesses.

HERBERT H. HENNEGIN.

Witnesses:
   J. D. RIPPEY,
   JOHN C. HIGDON.